(12) United States Patent
Ramirez Mancilla et al.

(10) Patent No.: US 8,203,713 B2
(45) Date of Patent: Jun. 19, 2012

(54) METHOD AND DEVICE FOR QUANTITATIVELY DETERMINING THE SURFACE OPTICAL CHARACTERISTICS OF A REFERENCE OBJECT COMPRISED BY A PLURALITY OF OPTICALLY DIFFERENTIABLE LAYERS

(75) Inventors: Jaime Ramirez Mancilla, Vina del Mar (CL); Rodrigo Rubio Aguilar, Vina del Mar (CL); Daniel Serpell Carriquiry, Vina del Mar (CL); Nicolas Slusarenko Fernandez, Vina del Mar (CL); Guillermo Vidal Quevedo, Vina del Mar (CL)

(73) Assignee: Aplik, S.A., Vina del Mar (CL)

( * ) Notice: Subject to any disclaimer, the term of this patent is extended or adjusted under 35 U.S.C. 154(b) by 362 days.

(21) Appl. No.: 12/634,609

(22) Filed: Dec. 9, 2009

(65) Prior Publication Data

US 2010/0141931 A1 Jun. 10, 2010

(30) Foreign Application Priority Data

Dec. 10, 2008 (CL) .................................. 3661-2008

(51) Int. Cl.
*G01N 21/25* (2006.01)
(52) U.S. Cl. ...................................................... 356/406
(58) Field of Classification Search .......... 356/402–425, 356/446, 51, 630
See application file for complete search history.

(56) References Cited

U.S. PATENT DOCUMENTS

| | | | |
|---|---|---|---|
| 5,428,450 A | 6/1995 | Vieillefosse et al. | |
| 6,007,332 A | 12/1999 | O'Brien | |
| 6,008,905 A | 12/1999 | Breton et al. | |
| 6,038,024 A | 3/2000 | Berner | |
| 6,561,800 B2 | 5/2003 | Lehmann | |
| 6,956,601 B2 | 10/2005 | Squilla et al. | |
| 7,006,126 B2 | 2/2006 | Kerschbaumer et al. | |
| 7,018,204 B2 | 3/2006 | Jung et al. | |
| 7,030,986 B2 | 4/2006 | Overbeck et al. | |
| 2005/0237531 A1* | 10/2005 | Roman | 356/446 |

* cited by examiner

*Primary Examiner* — Tarifur Chowdhury
*Assistant Examiner* — Abdullahi Nur
(74) *Attorney, Agent, or Firm* — Eric A. Hanscom; Todd J. Langford (57) ABSTRACT

A method and device to determine quantitatively the surface optical characteristics of an object of reference made up of a plurality of optically differentiable layers. The device includes lighting and image capture means, connected to analysing means which execute the method to obtain the parameters of the repair material components best fitting the optical characteristics of the dental environment of the subject under treatment. The result of the analysis through the method in the invention consists mainly in the identification of each one of the various materials which should constitute the different layers, as well as their respective thicknesses, and which are to lead to a dental repair with optimum optical characteristics. It is thus achieved that the repair be visually imperceptible, both under natural light and under ultraviolet light.

20 Claims, 8 Drawing Sheets

METHOD AND DEVICE FOR QUANTITATIVELY DETERMINING THE SURFACE OPTICAL CHARACTERISTICS OF A REFERENCE OBJECT COMPRISED BY A PLURALITY OF OPTICALLY DIFFERENTIABLE LAYERS

CROSS REFERENCE TO RELATED APPLICATIONS

This application claims foreign priority benefit to Chilean Patent Application Number 3661-08 filed on Dec. 10, 2008, the entirety of which is hereby incorporated by reference.

STATEMENT REGARDING FEDERALLY SPONSORED RESEARCH OR DEVELOPMENT

This invention was not federally sponsored.

FIELD OF THE INVENTION

This invention is related to a method and a device to determine quantitatively the surface optical characteristics of an object of reference made up by a plurality of optically differentiable layers. Additionally and complementarily, a method is offered to determine a combination of layers of restoration or constitutive materials such as dental repair materials (usually synthetic resins, although they could be of an another nature), presenting surface optical characteristics similar to those of the object of reference.

Referential application for the invention determines a combination of dental restoration materials, so that the surface optical characteristics of the reconstructed piece may prove closer to those of the real teeth in the environment of the repaired piece, in comparison with the surface optical characteristics determined through the previous art.

DESCRIPTION OF PRIOR ART

The teeth of the average human adult are constituted by 32 pieces. The visible area of each tooth is formed principally by three layers: enamel, dentine and pulp.

Enamel is a high hardness cover, which is located principally in the dental crown, its color varies between yellowish white and grayish white, depending of the degree of translucence it has.

Dentine is a hard tissue, with some elasticity, yellowish white not vascularized, which is immediately below the enamel and is the compound in the tooth which most contributes to its color.

Pulp is the inner most layer of the pulp, it is soft, pink in color and houses the blood vessels and nerve endings Both the enamel and the dentine are the layers which most contribute to the visual appearance of the tooth.

Numerous studies have been conducted to determine the color spectrum which best represents human teeth. One of these studies determines—through the measurement of the color in the higher incisor—that the color of the teeth is between the values of the CIEL lab system:

$$L^* = 70 \pm 4; a^* = -0.22 \pm 1; \text{ and } b^* = 18 \pm 3$$

A CIEL lab color spectrum is based on the Theory of Opposed Colors with Cartesian coordinates of luminance or clarity $L^*$ ($0 \leq L^* \leq 100$) and dimensions of opposed colors (chromatism), or colorimetric coordinates ($a^*$) and ($b^*$). The coordinate $a^*$ defines the deviation of the achromatic point corresponding to luminance, towards the red if $a^* > 0$ or towards green if $a^* < 0$. Analogously, coordinate b $b^*$ defines the deviation towards yellow if $b^* > 0$ or towards blue if $b^* < 0$.

Other Studies classify teeth by using the Munsell color System, locating the tooth color between the space limited by the shade coordinates 7.5YR to 5Y, a range of clarity from 4 to 8.5 and a purity range of 0 to 7.

The Munsell color system describes a set of colors in terms of three coordinates: hue, which measures the chromatic composition of the light reaching the eye; value, which indicates the luminosity or obscurity of a color in relation to a neutral gray scale; and chroma, which indicates the degree of saturation of a neutral gray, by the color of the spectrum. The hue is expressed in an angular scale with a 3.6° arch for each sheet or pattern form; it is based on five basic hues: red (R), yellow (Y), G (green), blue (B), and purple (P); as well as the five combined hues of the above (YR, GY, BG, PB, and RP), each hue has different degrees which are specified by numbers between zero (0) and ten (10) placed before the corresponding letter. Chroma and clarity are expressed in a linear or scale with a relation of 2.5:1 between them.

There is no agreement in the ranges of the colors and a definition has yet to be established for the dental color space. One of the main difficulties lies in the fact that, even within one single tooth, there is a wide range of hues (or chromaticity).

To satisfactorily meet the aesthetic demand (or visually perceptible demand) of the subjects or patients, specially in the restoration of the anterior area teeth, restoration material has been developed which are substantially free of metal, which try to emulate the mechanical and optical characteristics of the layers of the natural tooth. Thus, there are materials which resemble the optical characteristics of dentine and others of the enamel.

The suppliers of dental restoration materials who have obtained the best results, from the point of view of the optical behavior of these materials are those who supply three kinds of components for repairs imitating the tooth constitution:

Body Dentine, which determined the color of the restoration.

Opaque Dentine, which contributes the tooth opacity.

Synthetic enamel, which gives brilliance and translucence mainly in the incisal (end farthest from the base of the tooth area).

In general, the deepest layer in a repair is the opaque dentine, then is added the body dentine and finally the synthetic enamel (each layer is joined to the previous one with special colorless adhesives). Depending on the opacity, translucence and chroma required, it is possible to omit any one of the layers.

Measurement of the optic characteristics of the tooth such as color, translucence and opalescence, is of fundamental importance in the field of reconstructive odontology. The determination of the combination of dental restoration materials is attained in most cases through the visual comparison by the restoring professional (dentist or assistant) by using a color guide established by the dental restoration materials manufacturer, in which each color belonging to the said guides is labeled with the material required for its elaboration.

However, many of the hues of the natural teeth are not representative within this color spectrum in the guide, thus providing a reason why the adjustment found through this procedure is usually far from the aesthetic requirements desired by the patient.

On the other hand, the result of the procedure performed is noticeably influenced by a set of external factors that are not taken into account, such as the ambient lighting and the subjective opinion of the professional conducting the comparison. These conditions affect the color selection, making the adjustment unsatisfactory in most cases.

So as to overcome the inconvenience above, in the previous art several schemes have been proposed for the measurement and obtainment of the optic parameters appropriate for the problematic dental repair, which proves to be especially difficult if it is born in mind that the teeth have a great variety of hues and different degrees of translucence, even within one piece. An additional complication is the color measurement of these kinds of objects and the great specular reflectance their surfaces have. For this reason, it is necessary to implement illumination and acquisition systems designed to prevent these kinds of difficulties.

The methods and devices of the previous art designed for the acquisition and processing of the information on the color of the teeth can be divided, for the effects of this exposition, into two big groups: (a) a first group of methods or devices designed only to obtain high quality dental images, susceptible to be used in some process of elaboration of a dental repair, with synthetic resins or porcelain pieces, and (b) a second group of methods or devices in which apart from using an optical system to obtain the characteristics of the tooth, performs some method on the data recollected to design dental restoration.

In the first group, U.S. Pat. No. 6,956,601 to Squilla et al., presents a portable system for the capture and exhibition of the intraoral area based in a digital camera attached to an extensible piece, to acquire images of the inside of the mouth, and this device has a high capacity for connection with external peripherals.

Also in the first group mentioned, can be found U.S. Pat. No. 7,006,126 to Kerschbaumer et al., which features a device which basically uses two independent light sources to determine the structure and the color of the tooth analyzed, in which one of these sources is polarized light.

In the second group of methods and devices, the scheme presented by the previous art are mainly different for the following:

1. The kind of lighting used. Either because of the use of punctual lights sources, based on fiber optics or other types of lighting, which cover a larger area. Furthermore, this second group can consider other aspects such as the polarization of the incident light and the optical and/or mechanical devices used to ensure measurement conditions free of the external disturbances among other aspects.
2. The technology used to obtain the measurements. The spectrophotometric analysis of the light reflected is the preferred strategy; the fundamental differences are in the variety and magnitude of the wavelengths considered and in the width of the scanned spectrum band.
3. The set of optical characteristics quantified, which include the measurements of the color, the translucence, the fluorescence, the texture and the shape.
4. The procedures to obtain the repair. In particular, methods or procedures which permit applying mathematical or physical models to determine the type and necessary quantity of repair material, to better reproduce the visible characteristics of the real tooth.

One of these devices in the second group is the one described in U.S. Pat. No. 7,030,986 to Overbeck et al., which discloses a device and the procedures for optical measurements, commercialized under the name ShadeVision®. This device permits measuring the color, the brilliance, and the translucence of the tooth and conducts the analysis through the collection of the several images of one or two teeth, acquires through a system made up of a CCD (Charged-Coupled Device) sensor or CMOS (Complementary Metal-Oxide Semiconductor). An array of lenses and filters provides lighting which is highly localized and with different wavelengths within the visible spectrum. According to the measurements acquired, the Overbeck device and procedure generates a map of the two colors separating the areas of the different chromatic characteristics, information which is used to elaborate a dental prosthesis.

Objectives similar to those of the Overbeck patent are sought in U.S. Pat. No. 7,018,204 to Jung et al., which features a method to determine the optical characteristics of dental objects using an image element and a spectrometry device, marketed under the name of Vita EasyShade®. Like the Overbeck technique, the Jung method permits measuring the color and translucence of a real tooth. The main inconvenience the Jung invention has derives from its lightning and capture system derived from fiber optics, which only permits taking spectrophotometric measurements of small portions of a tooth, so the capture procedure must be repeated to obtain measurements of a tooth total area. On the contrary, the invention herein permits capturing color information, not only of a complete tooth in a single operation, which is already advantageous vis-a-vis the previous art, but permits capturing the color information of several teeth in one single act.

Another limitation of the previous art in U.S. Pat. Nos. 7,030,986 and 7,018,204, which is overcome with the invention herein, is that those devices of the previous art, which are limited only to analyzing portions of the teeth, do not permit making a previous estimate of the outcome of the repair without having to manufacture, previously, a sample prosthesis, thus preventing the professional involved and the patient from having a general appreciation of the aesthetic result of the repair before this is actually carried out.

There are inventions which offer a solution to the program of the "previous comparison", such as U.S. Pat. No. 6,561,800 to Lehmann and in U.S. Pat. No. 6,007,332 to O'Brien where, in both patents, it is divulged that the images of the different hues in a color guide of standard dental restoration materials are stored in memory, and they are compared with a real tooth color.

Even in the second group, the limitation in the "area of the teeth captured" is dealt with in U.S. Pat. No. 5,428,450 to Vieillefosse et al., and in U.S. Pat. No. 6,008,905 to Breton et al.

Nevertheless, the invention detailed in U.S. Pat. No. 6,038,024, to Berner, which features a method and a device to determine the specification of the color stimulus of an object, known commercially under the name of SpectroShade® and ShadePilot®, is the one which proposes a solution that includes a large area of image capture and permits the previous comparison of the results. To that end, Berner has an ergonomic piece that is adjusted to the patient's gums and lips, permitting the obtainment of a homogenous lighting in a large part of the anterior teeth. Furthermore, based on the stored information on dental restoration materials, it can determine the distance between the real tooth color and that one attained by the repair, expressing the difference in units of a pre established color space. The above difference is displayed on a screen, where both colors are displayed for a visual comparison of the result.

In spite of the above, Berner lacks a physical model describing the optic behavior of a dental restoration materials and does not include in the selection procedure the fluorescence phenomenon characteristic of natural teeth. The invention herein, on the contrary, overcomes this limitation by including a physical model that permits predicting the optical behavior—including fluorescence—of the materials that will constitute the proposed repair.

Finally, the state of the current technique evidences the lack of a device and a method to select materials for dental repair which can address reliably the relevant aspects of dental color acquisition and which permits the obtainment of a repair adjusted to the optical characteristics of the subject's teeth.

It is desirable to have methods which can provide the user with a general view of the procedure being applied, which is simple or natural, and which collects and examines the greatest possible amount of relevant information.

SUMMARY OF THE INVENTION

The invention herein offers a method and a device which constitute a system to assess the dentist facing the partial or the total repair of a tooth in the anterior area, allowing him or her to find the combination of reconstructive materials with the external optical characteristics closest to those of the real teeth in the environment of the repaired area.

To achieve a full description of said optical characteristics, information is collected of the surface of the teeth illuminated sequentially with 630 nm natural red light, 520 nm green, and 470 nm Blue. Then, it is illuminated with a 365 nm ultra violet light, to include also in the analysis the fluorescent properties of the natural teeth and of the dental restoration materials.

The device and method in the invention herein act as a system, since their interdependence is what permits achieving the objectives sought. Thus, one of the categories of the invention herein is a device for the lighting and capture of the images, connected to analyzing means which run a method, another of the categories of the invention herein which permits obtaining the parameters of the repair materials components better adjusted to the optical characteristics of the dental environment of the subject under treatment.

The finding of the analyses of the method in the invention are basically the individualization of each one of the various materials which should make up the different layers as well as their respective thicknesses, and which are to lead to a dental repair with optimum optical characteristics. The combination of restoration materials proposed by the method herein is that which is closest to the color, in terms of its red, green and blue components (herein below RGB, for the abbreviation in English) and different types of lighting. Thus, a repair is achieved which will be visually imperceptible, both under natural light and under ultraviolet light.

So as to determine an appropriate combination of materials for specific restoration, the method herein includes operations which seek, among the available repair materials, the combination that features spectral reflectance values as close as possible to the values obtained from the dental samples.

Preferably, though not limited to it, the method of the invention herein applies a function of conservation of luminous intensity based on the Kubelka-Munk theory, which in general permits relating the properties of the spectral reflectance of a substance with its constitution.

Alternatively, the method herein can provide, furthermore, a variety of options of repair material combinations, to permit the professional who will carry out such repair to appreciate the degree of coincidence of the colors of the combination or combinations proposed by the method herein before carrying out the repair. To that end, the results obtained with the method herein, can be displayed in methods of image visualization showing color maps, contrast of the target color with that attained, simulation of the repair on the image of the real tooth and alphanumeric information, among others.

Yet another additional alternative of the method of the invention herein, permits storing, for instance, in the subject's medical record, the images captured and the parameters of the repair material combinations proposed.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

For better clarity in the description of a method and device proposed, a description follows of one preferred modality of the invention with the support of figures, where.

DETAILED DESCRIPTION OF THE INVENTION

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

Figure 1:
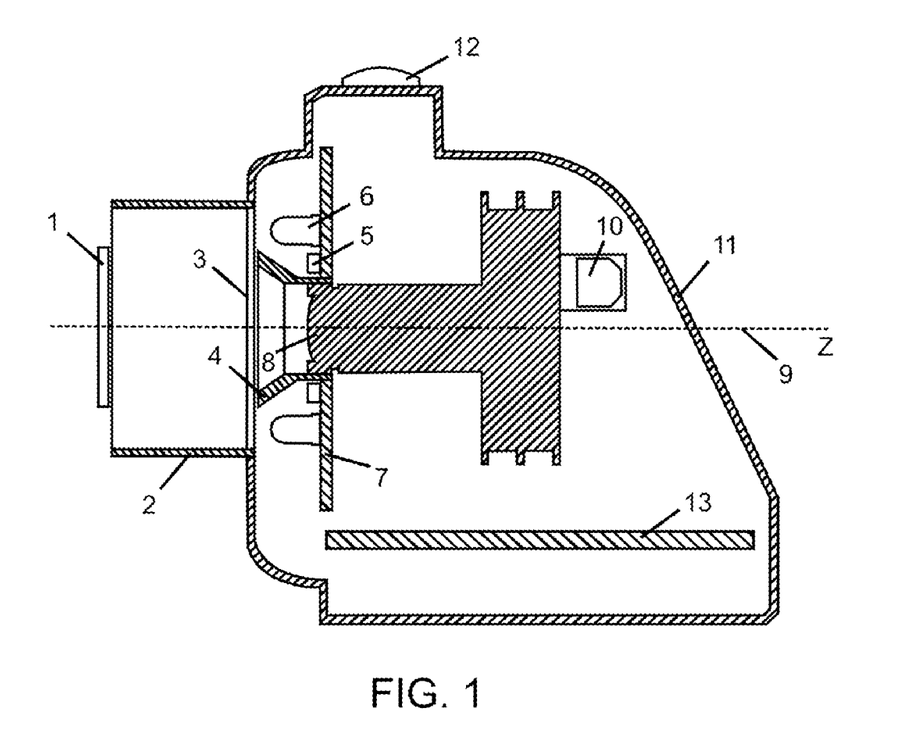
FIG. 1 is a schematic diagram showing one preferred modality of the captured device and of the sample.

FIG. 1 shows the schematic arrangement of the capture device (11) to obtain a dental image. The capture device (11) has annular lighting means (7), whose symmetry axis Z (9) corresponds to the normal joining the plane of the samples (1) to the lens in the digital image capture means (8). The position of the lighting means (7), in relation to the digital image capture means (8), has been conceived for the emitted light not to fall directly from its sources upon the optical elements of these digital image capture means (8).

The plane of the samples (1) is the place where the teeth of the patient or a sample of the restoration material (generally a plate), will be placed to evaluate the optical characteristics.

The means of lighting (7) are made up of two types of lighting means: an RGB lighting mean (5) constituted preferably by an internal lighting ring and a UV lighting mean (6) constituted preferably by an external lighting ring. These lighting rings are not necessarily coplanar between them and are constituted by a plurality of light sources, preferably pointed, and even more preferably constituted by light emitting diodes (LEDs). It should be obvious that it is not relevant whether the RGB (5) lighting means are "internal" in respect to the UV (6) lighting means or vice-versa.

The internal lighting ring (5) provides natural RGB light and is located outside of the line of direct incidence with the sample, as it is screened by a reflecting cone (4) that prevents the direct passage of the light beams from these internal lighting rings (5) to the sample located in the samples plane (1). In the context of this description, "reflecting cone" is to be understood in an ample sense, that is to say, a reflecting surface permitting an appropriate concentration of lighting in the area to be lit such as revolution paraboloid mantles, pyramidal mantles, (single or stacked and with successive variable inclinations), etc., should be considered as included, whether faceted or not, and a combination of two or more of such reflecting "cone" surfaces.

The external light ring (6) provides ultraviolet light, and preferably, although not limited to it, will be placed in such a way that it will not be significantly screened by the reflecting cone (4).

Between the plane of the samples (1) and the lighting rings (5,6) are arranged diffusing translucent means, each randomly refract the light beams from both lighting rings (5,6) to produce a specially homogeneous lighting and prevent the counter producing effect of the teeth whiteness, caused by the smoothness and the moisture of their surface.

Figure 2:
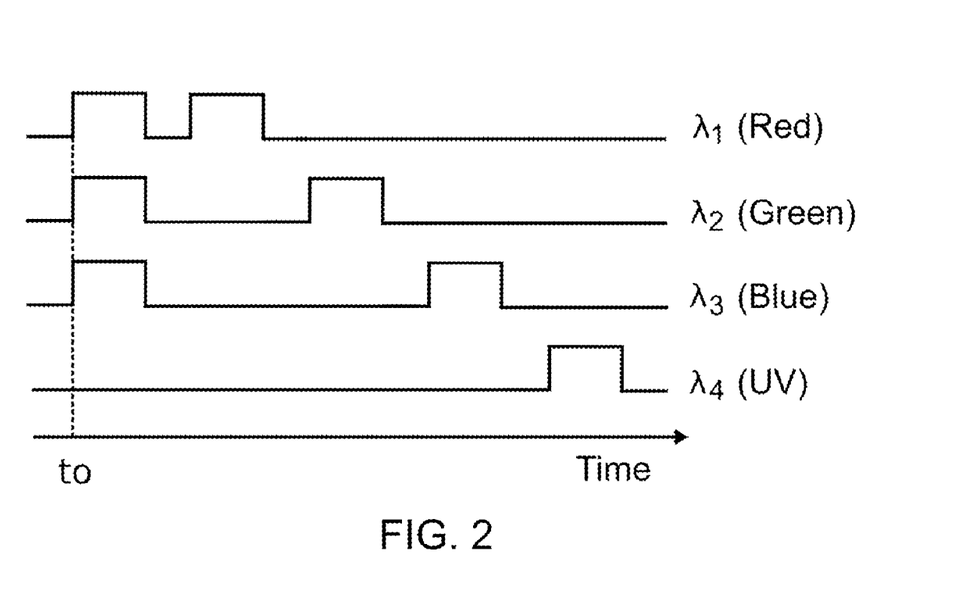
FIG. 2 is a schematic graphic showing the sequence of lighting by the captured device in FIG. 1.

Inside the capture device (11) are lighting sequence means (13). As shown in FIG. 2, the lighting sequence is made up of five light pulses, separated by time intervals in which no light is on. A first pulse, white (RGB), starts the sequence of image capture, mixed through four pulses are activated sequentially, the lighting of each one of the four types of "colors" (R,G,B, and UV) and their corresponding images are collected. The order in which the lighting of each one of the four colors is activated is not relevant, provided that this order be kept in the process.

The light sequence means includes timing and control means (not shown) which permit configuring the amount of time and the light intensity with which the RGB (5) and the UV lighting means (6) go on, as well as commanding which color will be activated at a given moment.

When LEDs are used as light sources, lighting in the area of the visible spectrum or natural light is obtained through eight RGB type LEDs.

The optical characteristics preferred for each type of natural lighting (or within the visible spectrum) are summarized in the following table, considering a CIE-xyY color space:

TABLE 1

| WAVE LENGTH 'PEAK' | BAND WIDTH | COORDENATES IN CIE xyY | APERTURE ANGLE PREFERRED |
|---|---|---|---|
| 630 nm | 610-650 nm | x = 0.677; y = 0.308 | 120° |
| 520 nm | 480-560 nm | x = 0.200; y = 0.684 | 120° |
| 470 nm | 430-510 nm | x = 0.135; y = 0.066 | 120° |

On the other hand, the ultraviolet light, when using LEDs is obtained with 6 UV type LEDs with the following preferred emission characteristics:

TABLE 2

| WAVE LENGTH 'PEAK' | BAND WIDTH | APERTURE ANGLE PREFERRED |
|---|---|---|
| 365 nm | 355-375 nm | 100° |

The capture device (11) includes an external perimeter screen (2) fitted around, and in a substantially ex-inscribed relation, to the external illuminating ring (6), projecting towards the plane of the sample (1), permitting the isolation of the sample from the undesirable influence of the environmental lighting when it is found in the sample plane (1).

The device and the method have been designed so as to permit making a quick and simple repair, in three basic steps:
  a. Positioning of the device (11) in front of the patient's teeth, positioned in the plane of the samples (1), ensuring that the image includes a dental area with the color to be homologue in the repair;
  b. Recollection of the information, a procedure which starts when the device (11) is activated; and
  c. Selection of an area in the image containing the color in which it is intended to reproduce in the repair.

Figure 3:
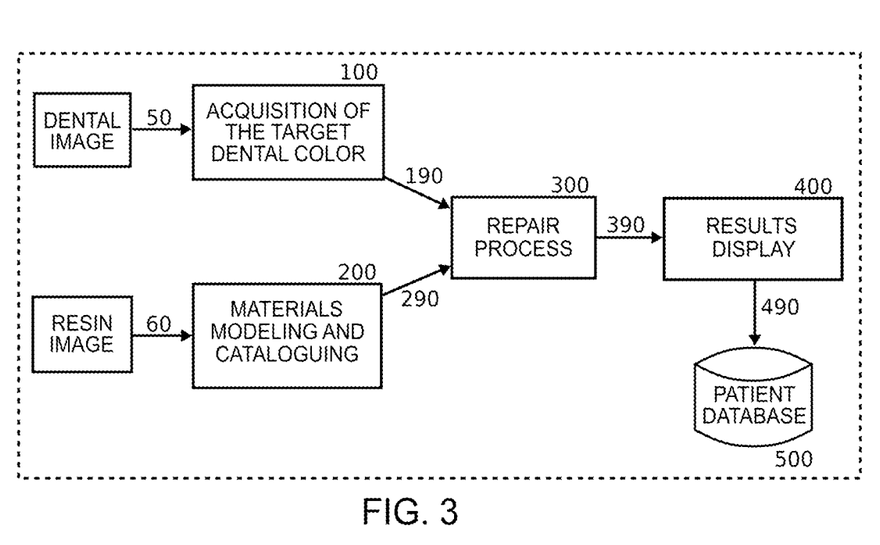
FIG. 3 is a diagram of the blocks constituting the general functioning of the invention.

As shown in FIG. 3, the method which permits obtaining the set of material for the repair is made up of two big stages which conduct analyses of the two corresponding types of results:
  a. "Acquisition of the target dental color" (100), which is carried out for each subject and for each repair; and
  b. "Materials Modeling and Cataloguing" (200), which is performed sporadically for each supply of new repair materials.

Once the "Repair Process" (300), has been carried out, the method displays the results (400) and, on an optional basis, stores them in a database (500), which can be related to the medical records of each patient.

The input signal (50) to the target dental color acquisition stage (100) corresponds to a set of digital images (50), which represent the anterior area of the subject's or patient's teeth. This set of digital images (50) is formed by two groups: one first group containing information on the light response of the object to the white light (or to its RGB components); and a second group which contains information on the light response of the object to UV light. Thus, the set of digital images (50) contains information of the three RGB channels with which the object responds to the white light (or to their RGB components) and also contains information on the three RGB channels with which the object responds to the UV lighting. Note: to the effects of this description, the same reference (50) is used, both for the input signal and for the images constituting such signal, because it is the same entity.

Preferentially, the first group of digital images (50), corresponding to the response of the object to the white light, consists in three monochromatic images captured independently and successively when the object is illuminated with the corresponding monochromatic lights R, G, and B, although the order of the monochromatic lighting can be different (for example, GRB). Inversely, and preferably, the second group of digital images (50), which correspond to the response of the object to UV light, is a color image captured when the object is lit with UV light.

Other alternatives of the invention herein, concerning lighting and capture of information of the light response of the object are making one single color capture, either lighting the object with a highlight or with a simultaneous irradiation of R,G, B monochromatic lights, or with a sequential irradiation of R, G, and B monochromatic lights. Yet another alternative in the invention herein, in this context, is to conduct three successive monochromatic captures of the response to UV lighting for which purpose successive filtered R, G, and B are applied, thus obtaining the corresponding captures of R, G, and B responses.

In each one of the images of the set of digital images (50) there must be an area preferably not under 10 by 10 pixels containing the color to be homologued in the repair. As a result of the processing of the set of digital images (50) through the target dental color acquisition stage (100) an output signal (190) is generated, containing information on the RGB components representing the target color that is intended to be emulated in the dental restoration material.

On the other hand, the materials molding and cataloguing stage (200) is fed with another input signal (60) consisting in a set of digital images (60) obtained from a dental restoration material sample, of a given origin (or trade brand) and type, from which the extraction of color by thickness (210) is performed and, with this information, an adjustment method (229) is applied (preferably, although not limited to it, the method of minimum squares is used) of the color obtainment model, preferably, Kubelka-Munk model, and material characterization. The same considerations for lighting and capture of images explained in relation to the set of digital images (50) are applied here for lighting and capture of the set of digital images (60). Note: for the effects of this description, the same reference (60) is used for both the input signal and for the images making up such signal, as it is one and the same entity.

The properties of all the restoration materials analyzed are recorded on a catalogue (230—see FIG. 7) which will send, upon requirement, output signal (290) with the color characteristics of each material catalogued. The information in the output signal (290) of catalogue (230) participates in the prediction of the color that the superimposition of the various layers of materials in the restoration will acquire.

In the repair operation (300) the Kubelka-Munk model is used to predict color of the superimposition of the dental restoration material and through an exhausted search to determine the best combination, uses as a criterion the minimization of the Euclidian distance among the RGB components in the target color (190) and the color attained by the combination.

The professional who will make the repair has at his/her disposal the findings of the analysis at results display stage (400), which will indicate to him/her which material to use in the restoration and the thickness at which they are to be applied. Further, the method displays the possibility of replacing the color attained by the combination in the real tooth image, to appreciate the degree of coincidence or match of the color, before carrying out the repair on the patient. The display of the above information is carried out through image visualization means, whereby color maps, contrast between the target color and the attained one, simulation of the repair on the image of the real tooth, alphanumeric information, or a combination of the above is shown to the user. Image visualization means include without limitation liquid crystal displays (LCD), cathode ray tube (CRT) displays, and thin-film-transistor (TFT) LCD displays.

On an optional basis, it is possible to store in the database (500) the images captured of the subject or patient, as well as the diagnosis of the combination of restoration materials suggested by the method.

Kubelka-Munk Model

So as to provide a theoretical framework to describe the optical properties of the superimposition of the restoration material, the method and device proposed use a physical model of the luminous intensity conservation that irradiates through layers with different optical properties. These properties are modeled through two parameters: the dispersion parameter and the absorption parameter.

The purpose of the modeling is to find the reflectance of a layer of material (fraction between the reflected luminous intensity and the incident luminous intensity) in function of the two parameters characterizing it:

Absorption Coefficient $K(\lambda)$: corresponds to the fraction of luminous intensity absorbed by the means per unit of distance, when this is very small.

Dispersion Coefficient $S(\lambda)$: corresponds to the fraction of luminous intensity dispersed by the means per unit of distance, when this is very small.

It should be noticed that these coefficients depend on the nature of the material and, for most cases, on the wavelength of the incident light $\lambda$.

This model provides the reflectance of a material in function of its absorption coefficient $K(\lambda)$ and dispersion $S(\lambda)$, coefficient of its thickness e and of background reflectance $R_f(\lambda)$ on which said material is placed:

$$R(S(\lambda), K(\lambda), R_f(\lambda), e) = \frac{I}{I_0} = \frac{1 - R_f(\lambda) \times (a - b \times \coth(b \times S(\lambda) \times e))}{a - R_f(\lambda) + b \times \coth(b \times S(\lambda) \times e)}$$

where $R(S(\lambda), K(\lambda), R_f(\lambda), e)$ is the reflectance of the surface for a pre-established wave length. Further:

$$a = \frac{S(\lambda) + K(\lambda)}{S(\lambda)};$$
$$b = \sqrt{a^2 - 1}$$

And where $\coth(\alpha)$ is the argument $\alpha$ hyperbolic cotangent, that is to say:

$$\coth(\alpha) = \frac{\exp(\alpha) + \exp(-\alpha)}{\exp(\alpha) - \exp(-\alpha)}$$

This procedure can be applied to the superimposition of a number of layers considered as convenient, where the reflectance of the nth layer is given by:

$$R_n(S_n(\lambda), K_n(\lambda), R_{n-1}(\lambda), e_n) = \frac{1 - R_{n-1}(\lambda) \times (a_n - b_n \times \coth(b_n \times S_n(\lambda) \times e_n))}{a_n - R_{n-1}(\lambda) + b_n \times \coth(b_n \times S_n(\lambda) \times e_n)}$$

where $R_{n-1}(\lambda)$ is the reflectance of the previous layer, being $R_0(\lambda) = R_f(\lambda)$.

The model applied to describe the phenomenon of the fluorescence of the materials is similar to that used with natural light. It should be assumed that incident light is of a wavelength belonging in the range of ultraviolet called $\lambda_{UV}$.

So as to use the same formulation proposed for the model with natural light, it is necessary to assume that in the event of lighting with ultraviolet light, the luminous intensity reflected and dispersed in the visible spectrum, in a section of infinitesimal thickness is proportional to the luminous intensity reflected and dispersed of wavelength $\lambda_{UV}$. That is to say, it is assumed that the fluorescence phenomenon established that the ratio between the luminous intensity reflected in the visible spectrum and the incident in the ultraviolet is constant. Then, if such ratio is denoted as $\kappa$, the absorption and dispersion coefficients are modified as:

$$S_{UV}(\lambda)=\kappa \times S(\lambda); K_{UV}(\lambda)=\kappa \times K(\lambda)$$

Acquisition of the Target Dental Color

This procedure starts when the user activates the capture device (11) thus starting a lighting sequence.

The capture device (11) must be located in front of the patient, such that his teeth are in the plane of the samples (1) and ensuring that the color of the teeth intended to be emulated in the repair will be captured in the image.

The information collected and constituting the set of digital dental images (50) corresponds, preferably, to 3 monochromatic images: one lit with a red light, another with green, and another with blue. A fourth image is in colors (RGB) and is obtained under ultraviolet lighting. This means that, according to this preferred modality, six matrices are available with light data representing the same sampled area of the tooth: three matrices with each one of the RGB components obtained with the RGB monochromatic lights and three matrices obtained by separating the RGB components of the image in colors obtained under UV lights.

Figure 4:
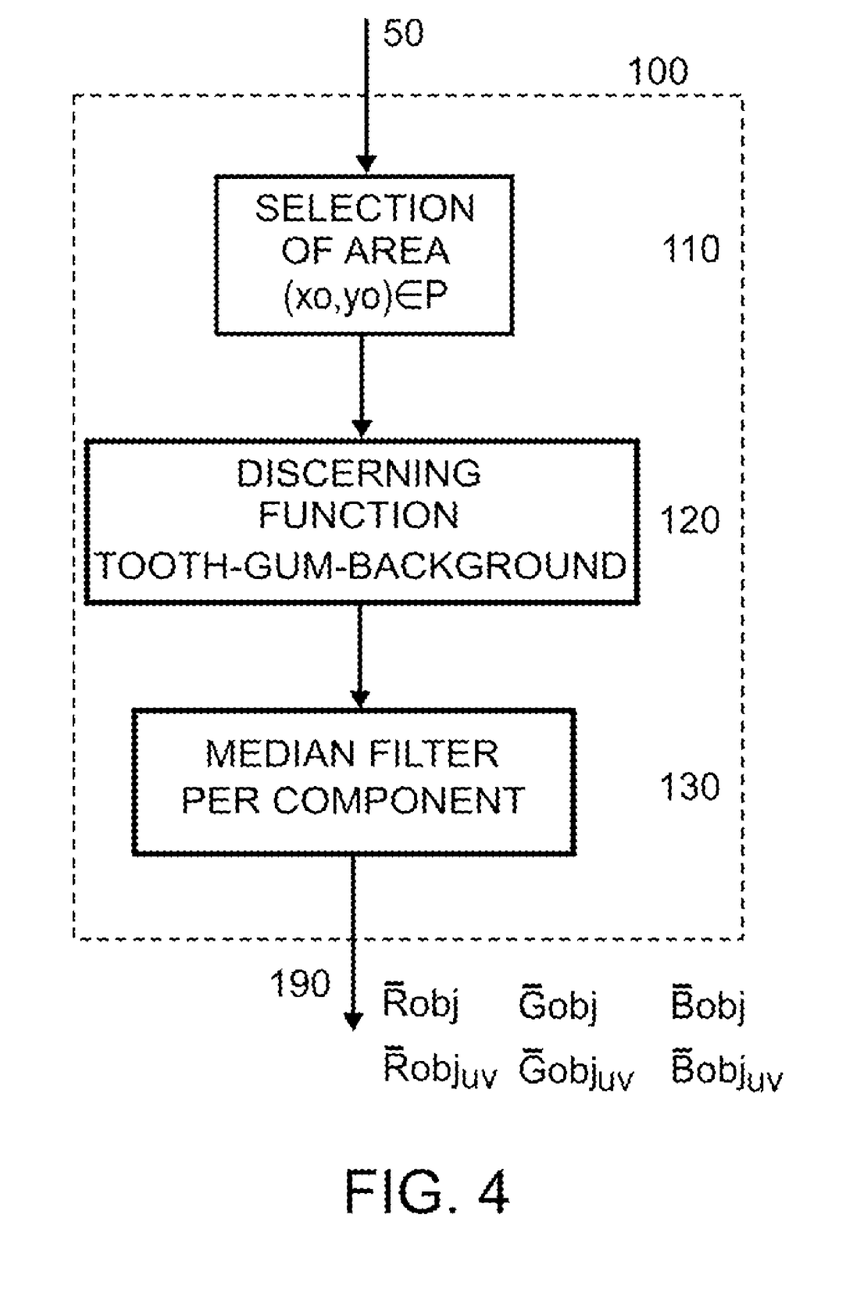
FIG. 4 presents a diagram block of Dental Color of the Acquisition stage.

With these six matrices with light data, from the four R, G, B, and UV captures, which also correspond to the Entrance signal (50), starts the stage of acquisition of the target dental color (100), which is shown in greater detail in FIG. 4. In a first sub stage, consisting in the choice of area (110), the user selects the polygonal area in the dental images constituting the set of digital images (50) where the color desired for the repair can be found. Such area is denoted by P and contains all the pixels $(x_0,y_0)$ contained in the internal area of the polygons of the choice.

Given that the color of human teeth ranges from grayish white to yellow, it presents a high contrast with the gum color, which is predominantly red, and with the background color of the mouth, which is close to black. Taking these properties into consideration, preferably, the following criteria is applied in the discerning sub stage (120) to determine whether the pixel attained belongs to the teeth:

$$K_R > R(x_0,y_0) > E_R$$

$$K_G > G(x_0,y_0) < E_G$$

$$K_B > B(x_0,y_0) < E_B$$

These constants $K_{R,G,B}$ and $E_{R,G,B}$ depend, on great measure, of the power and color of the lighting used, and they should be determined through a procedure of equipment calibration. In such procedure, lighting should be adjusted so as to get the greatest possible contrast between the teeth color, the gum color and the color of the background of the mouth. A right calibration must not allow the saturation of teeth RGB coordinates and prevent RGB coordinates form the background of the mouth from exceeding a value 15, out of a maximum of 255 value. In practice, for the preferred modality, the values for $K_{R,G,B}$ have been set as: $K_R=K_G=K_B=60$. In the case of the constants $E_R$, $E_G$ and $E_B$ they have been set at 70.

If the pixel of the $(x_0,y_0)$ position meets some of the above conditions, it is discarded, considering it as not belonging to the teeth. That is to say, if it's red component is significantly higher than the others or if the three color components do not exceed a certain pre-established threshold.

The values of the pixels exceeding the above stage are "softened" through a median filter stage per component (130) to obtain a single value for the components of the target color.

Preferably, this stage of the median filter per component (130) is applied to a vicinity h of the point $(x_0,y_0)$, for each RGB component of the six matrices constituting the input signal (50), and signal (190) is generated, made up of $\overline{R}obj$, $\overline{G}obj$, $\overline{B}obj$ and $\overline{R}obj_{UV}$, $\overline{G}obj_{UV}$, $\overline{B}obj_{UV}$, corresponding to the RGB components of the visible sample response to the white (R,G, and B) light and to the ultra violet light, respectively.

Modelling and Cataloguing

The Kubelka-Munk model permits determining the color of a restoration material layer of a known thickness, placed on the pre-established support material. To achieve this determination, it is necessary to know three aspects:

The spectrum of the incident luminous signal $I_0(\lambda)$; that is to say, the intensity of the light of each wave length type that falls on the material. If no fluorescence phenomena are considered, the wavelengths in the visible range (400-700 nm) range suffice.

The background reflectance $R_f(\lambda)$ for each wavelength in the required spectral range.

The absorption $K(\lambda)$ and dispersion $S(\lambda)$ parameters of the object under observation, for the spectral range required.

With this information it is possible to determine the color of the restoration material sample, expressed as a combination between its light dispersion and absorption properties, and those of the incident light and the background material color.

Nevertheless, the digital description of a color, in general, is constituted only by three spectral components. In the case of the method and device herein, the RGB color space is used, which renders red, green, and blue, representing a large range of colors through combinations of these three components (RGB). Thus, the problem boils down to knowing $I_0(\lambda)$, $R_f(\lambda)$, $K(\lambda)$ and $S(\lambda)$ for the three primary wave lengths, denoted as $\lambda_R=630$ nm, $\lambda_G=520$ nm and $\lambda_B=470$ nm.

As the lighting conditions are standardized, that is to say, all images are captured with an incident light of the same intensity and as the geometric relationships between the sample and the light source are maintained, it is possible to consider that:

$$I_0(\lambda_R)=1; I_0(\lambda_G)=1; I_0(\lambda_B)=1$$

So, the luminous intensity reflected (corresponding to the light measured), is proportional to the material reflectance.

The background reflectance $R_f(\lambda)$, is set by using a known color background material. It should be noticed that, to these effects, black is advantageous, since it produces a sharp contrast with the restoration materials color and, furthermore, simplifies the calculation expressions. In practice, the reflectance of the background materials should be measured to calculate accurately.

Then, the factors yet to be determined are the values of the $K(\lambda)$ and $S(\lambda)$ parameters and characteristics of the material under study for the three wave lengths concerned. For the above, a set is collected of measurements of the sample color for various thicknesses and these data are used to determine the parameters that best fit the reflectance curve of the model to the measurements taken.

In practice, because of the brittleness of the materials, samples cannot be built with thicknesses under 0.3 mm. On the other hand, the maximum thickness is selected considering that every dental restoration material, based on synthetic resin, lose most translucence when exceeding 3 mm in thickness. The design of the shapes of the restoration material is also a difficulty to be solved, because it is necessary to use the least amount of material possible, seeing that the piece is strong enough to be manipulated and that it should also permit a color extraction relatively simple for the stages of the method herein.

Due to the LEDs arrangement in the lighting device, the incident light in the sample has a circular symmetry around the Z-axis (9), which establishes a criterion for the shape of the restoration material sample pieces for the model that the method herein deals with. Said geometry should be extracted from the images captured.

Figure 5A:
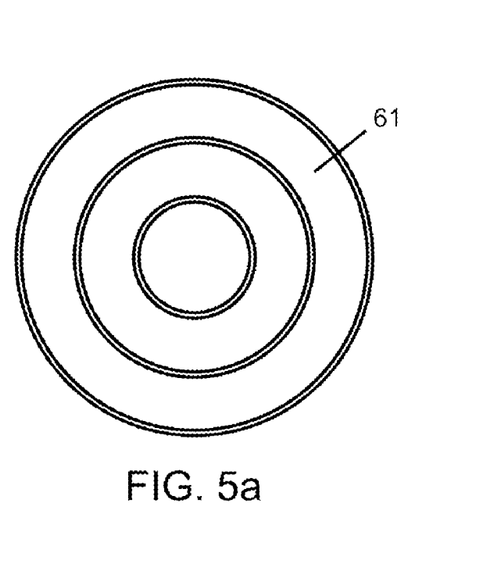
FIG. 5a to FIG. 5c are a schematic presentation of a thin sample of restoration material with different thicknesses in their views in upper plant elevation and perspective, respectively.
Figure 5B:
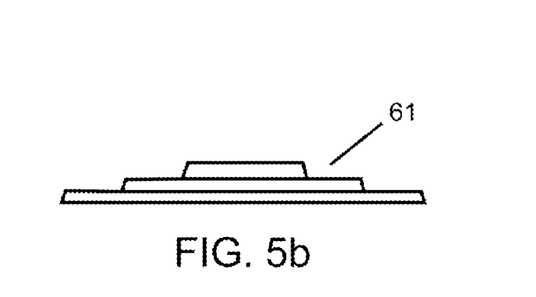
Figure 5C:
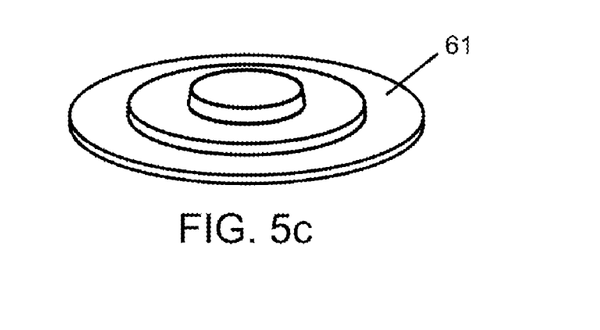
Figure 6A:
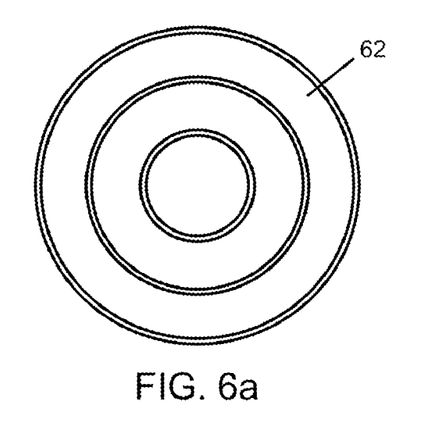
FIG. 6a to FIG. 6c are a schematic presentation of a thin sample of restoration material with different thicknesses in their views in upper plant elevation and perspective, respectively.
Figure 6B:
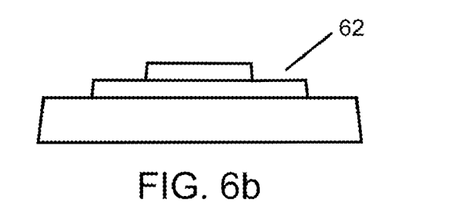
Figure 6C:
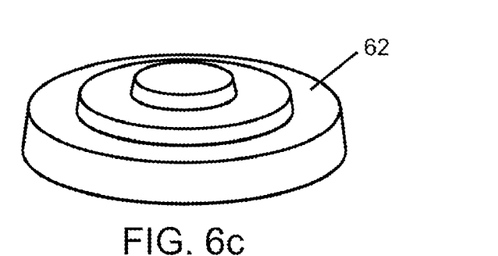

According to the above practical considerations, and to a method preferred modality, the sample pieces used in the materials modeling and cataloguing stage (200) have a circular shape with a 15 mm radius and are constituted by a succession of substantially concentric discs, the radii of which are decreasing as the corresponding discs shift away from the base of the set formed by them, as represented in the schemes in FIGS. 5a to 5c (thin sample) and FIGS. 6a to 6c (thick sample). The method, in its preferred modality, considers collecting six thickness measurements, obtaining the color of the concentric discs in a thin sample (61), with three discs: 0.3-0.8-1.3 mm and the thicknesses of three discs of a thick sample (62): 2.2-2.8-3.6 mm.

Figure 7:
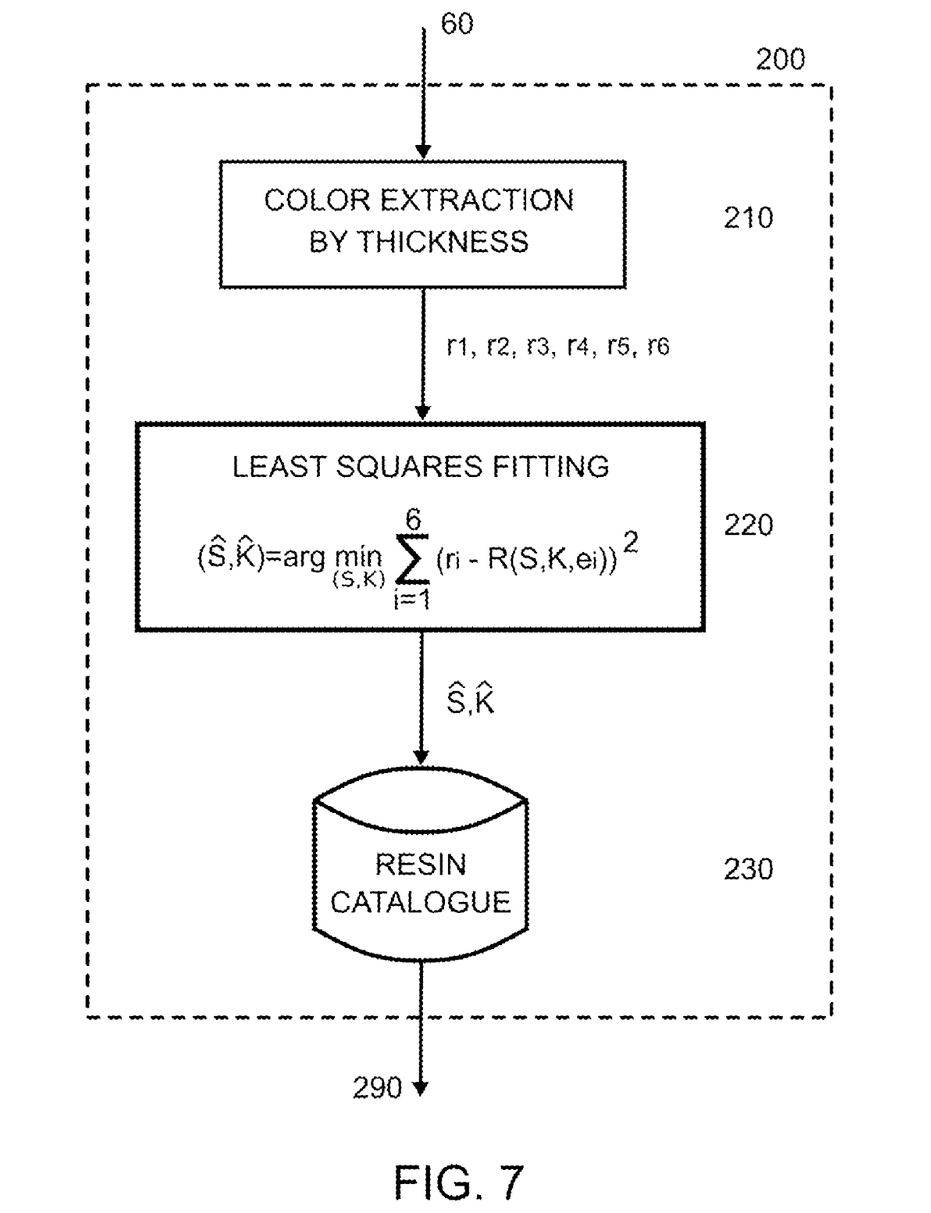
FIG. 7 corresponds to a block diagram of the Materials Modeling and Cataloguing stage.

The materials modeling and cataloguing stage (200) is represented in detail in FIG. 7, showing that input corresponds to the set of images (60) of a dental restoration material sample. The applied operations are represented considering only one color (monochromatic images, for an incident light of a known wave length $\lambda_0$). The rest of the images receive a similar treatment.

The materials modeling and cataloguing (200) includes a first sub stage of color extraction by thickness (210) that permits obtaining the value of the color components of the color with which the material is perceived when it has pre-established thicknesses. To that effect, color extraction by thickness (210) consists in obtaining the average of the values of the pixels color components belonging to the exposed sector of each concentric disc in the sample (61, 62). It has been considered that the images in the samples (61, 62) are previously standardized, through the correction of possible defects produced by the lighting geometry. The first three values shown in the diagram: $r_1$, $r_2$ and $r_3$ are obtained from the exposed sectors in the thin sample discs (61). The following three values: $r_4$, $r_5$ and $r_6$ are obtained from the exposed sectors of the discs in the thick sample (62). To prevent the undesirable disturbance at the edges of each disc, the areas where the color is obtained from are selected so as to leave the border between two discs of successive thicknesses out of the evaluation.

A second sub stage consists in the adjustment of values (220) to obtain various representations of the absorption coefficient $K(\lambda)$ and of the dispersion coefficient $S(\lambda)$. In the preferred method modality, the adjustment is made through the model of non-linear adjustment by minimum squares. The optimization to find the estimates of $K(\lambda)$ and $S(\lambda)$ can be expressed as the minimization of the quantity:

$$\sum_{i=1}^{6}[r_i - R(S(\lambda_0), K(\lambda_0), R_f(\lambda_0), e_i)]^2$$

This operation consists in determining which are the optimums $K(\lambda)$ and $S(\lambda)$ parameters that best adjust the reflectance curve to the measurements extracted at the sub stage of color extraction by thickness. The adjustment is done through an iterative procedure described by:

$$\begin{bmatrix}S_{k+1}\\K_{k+1}\end{bmatrix}=\begin{bmatrix}S_k\\K_k\end{bmatrix}-2\alpha\sum_{i=1}^{6}\begin{bmatrix}(r_i-R(S_k,K_k,R_f,e_i))\frac{\partial R(S_k,K_k,R_f,e_i)}{\partial S_k}\\(r_i-R(S_k,K_k,R_f,e_i))\frac{\partial R(S_k,K_k,R_f,e_i)}{\partial K_k}\end{bmatrix}$$

The value of $\alpha>0$ controls the convergence of the procedure. A very high value of $\alpha$ accelerates the convergence but loses accuracy. In practice, it has been determined that it is possible to use any $\alpha<5$. In the preferred method modality, $\alpha=2$ is used. The initial conditions are set according to the knowledge of the dental restoration materials studied. The values of $S_0(\lambda)$ and $K_0(\lambda)$ can be determined through the statistical analysis of the materials modeled; alternatively, by also using a 288 resins database that includes the values $S_0(\lambda)=1.02\pm0.50$ and $K_0(\lambda)=0.43\pm0.37$. In the preferred modality the values: $S_0(\lambda)=1.0$ and $K_0(\lambda)=0.4$ are used.

A third sub stage of information storage in a catalogue (230) consists in storing the variables $r_1 \ldots r_6$ obtained in sub stage (210) and the $K(\lambda)$ and $S(\lambda)$ parameters obtained in the sub stage (220), for each restoration material samples analyzed and associating them to data proceeding from them, such as for example: brand, type, internal code, etc.

Repair Process

Figure 8:
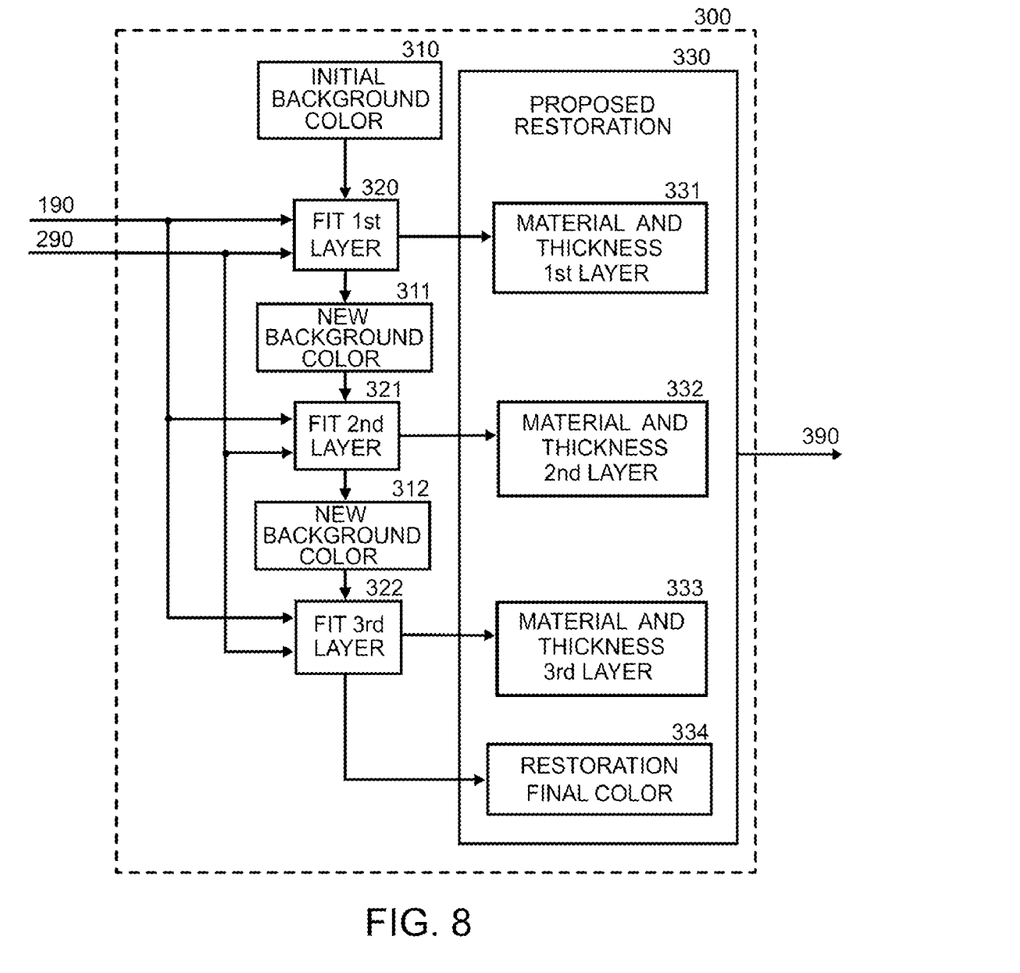
FIG. 8 presents a block diagram of a Repair Process stage.

The repair stage (300) appears in the block diagram in FIG. 8. This stage uses as input the target color components (190) coming from the dental color acquisition (100) and the signal components (290), which is extracted, upon requirement, from the catalogue (230) and contains the characterization of each restoration material and so it is possible to predict the color of any combination of the materials in the catalogue.

The database (230), cataloguing all the brands and types of dental restoration materials modeled can be used on a section-by-section basis, so the brands preferred by the professional can be used, depending on the availability of material at his disposal.

The method permits repairs using different dental restoration material combinations, depending on the area of the tooth where the reconstruction will take place. According to the different combinations of presence of the layers of enamel, body dentine and opaque dentine, six types of repair can be considered:

TABLE 3

| LAYERS RECOMENDED FOR THE REPAIR | TOOTH AREA | DESCRIPTION |
|---|---|---|
| Opaque Dentine | Cervical | Used where a large amount of opacity is needed |
| Opaque dentine + Body dentine | Cervical | Used in those cases in which opaque dentine is not enough to reach a good color adjustment |

TABLE 3-continued

| LAYERS RECOMENDED FOR THE REPAIR | TOOTH AREA | DESCRIPTION |
| --- | --- | --- |
| Body Dentine | Medium | Used where a high color adjustment is required and opacity is not a very important requirement. |
| Opaque Dentine + Body dentine + Enamel | Medium | Used when opacity is required, and when the repair should have a high color adjustment and the surface translucence and sheen real teeth have. This is the most demanding combination concerning the method herein, and with which the best results are obtained. |
| Body dentine + Enamel | Incisal | Recommendable when a repair with a certain degree of translucence is required, but when color remains an important factor. |
| Enamel | Incisal | Used when the translucence characteristics exceed the needs of a good color match. This repair is used generally in young teeth. |

As can be inferred from the above Table, it is possible to choose the materials to be used in the search for an optimum repair. However, all of them are individual cases of the general type of repair, which includes the three layers: opaque dentine, and body dentine and enamel. For that reason the operation will be described for the attainment of this latter, general type of repair (300).

The repair stage (300) starts with the obtainment from the catalogue (230) of all the parameters (290) of the opaque dentine. Next, in sub stage (320), the material and the thickness of the first layer are determined. To that effect, parameters (290) and background color (310) are used with the Kubelka-Munk model, to build reflectance tables for each candidate material. The reflectances just obtained are compared with target color (190), recording the material and thickness with the color closest to the color desired for the repair.

The process continues with the decision on body dentine, through the adjustment of the second layer (321), with the same procedure as that of the previous layer, but now considering as background color that attained by the previous layer (311). A similar process is followed for the next enamel layer (322), using the background color established by the previous stage (312), thus obtaining the final color for the repair (334).

Figure 9:
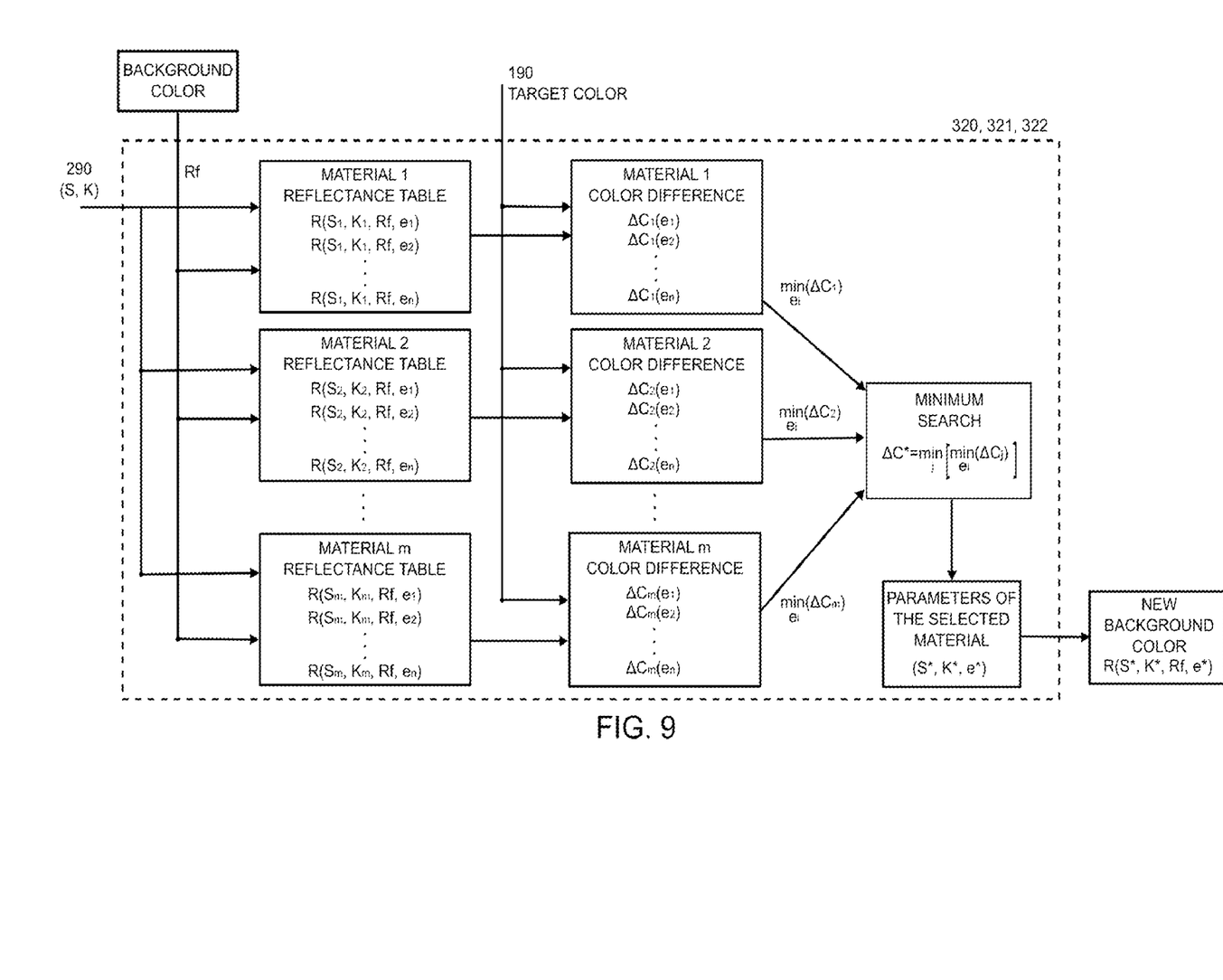
FIG. 9 corresponds to an internal block diagram of the Layer Adjustment sub stage in the diagram in FIG. 8.

The adjustment at each of the sub stages (320), (321) and (3220 is shown in FIG. 9, which is obtained by searching for the material which minimized the error given by:

$$\Delta C(j) = \alpha_{RGB}\Delta C_{RGB}(j) + \alpha_{UV}\Delta C_{UV}(j)$$

where $$\Delta C_{RGB} = WR(\overline{R}obj - R(S_j(\lambda_R), K_j(\lambda_R), R_f(\lambda_R), e))^2 +$$
$$WG(\overline{G}obj - R(S_j(\lambda_G), K_j(\lambda_G), R_j(\lambda_G), e))^2 +$$
$$WB(\overline{B}obj - R(S_j(\lambda_B), K_j(\lambda_B), R_f(\lambda_B), e))^2$$

and $$\Delta C_{RGB} = WR(\overline{R}obj_{UV} - R(S_{UV_j}(\lambda_R), K_{UV_j}(\lambda_R), R_{fUV}(\lambda_R), e))^2 +$$
$$WG(\overline{G}obj_{UV} - R(S_{UV_j}(\lambda_G), K_{UV_j}(\lambda_G)R_{fUV}(\lambda_G), e))^2 +$$
$$WB(\overline{B}obj_{UV} - R(S_{UV_j}(\lambda_B), K_{UV_j}(\lambda_B), R_{fUV}(\lambda_B), e))^2$$

That is to say, the error is measured as an addition weighted by the discrepancy between the target color RGB components and the candidate color. Sub index j searches through all the candidate materials for the layer under analysis, until it finds the material that minimized the ΔC quantity.

Weighing is done to prefer color matching under a pre-established lighting. The greatest importance is given to the adjustment under natural (white) light, for which it is set at $\alpha_{RGB}$=0.9 and $\alpha_{UV}$=0.1. These alpha values, in general, depend on the importance that one intends to give natural light over ultraviolet light; for standardization considerations $\alpha_{RGB}+\alpha_{UV}$=1 is selected.

The WR, WG, and WB constants depend on the layer being applied, since, in the case of dentine, the prevailing color is yellow (red+green), over blue, while in enamel, blue largely prevails, then green and finally red.

The proposed repair (330) corresponds to the suggestion of the materials that will constitute each layer, as well as their optimum thickness, as determined by each adjustment stage (320), (321) and (322) in the search process. This proposed repair (330) is made known to the user through the output signal (390) and which includes the global color components attained by it and which can be used for the previous comparison.

A detailed description has been given based on an object of reference, which includes discussion of teeth and dental restoration materials. However, it should be apparent for a specialist in different technical areas the application of the present method and device to various applications, other than dental ones, by adapting the constant values to the materials and lighting typical of said other various applications.

The variety of possible applications can be found in equally diverse specialities, such as art, archaeological restoration, industries manufacturing building or pigmented coating materials, quality graphic prints, fabrication of prostheses for different parts of the body that will be visible, manufacture of optical filters for technical, art or recreational photography, among many other applications.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What we claim is:

1. A method to quantitatively determine the surface optical characteristics of an object of reference made up of a plurality of optically differentiable layers and the characteristics of a restoration or constituent materials thereby enabling a determination of a combination of layers of restoration or constituent materials having, as a whole, surface optical characteristics similar to that of the object of reference, comprising the following steps:

(a) lighting the object of reference with one or more light sources, where the light sources comprise, jointly or separately, the red (R), green (G), blue (B), and ultraviolet (UV) channels;

(b) obtaining images of the object of reference, where the images are capable of containing information to generate six matrices with light data; with three of said six matrices containing respective R, G, and B components obtained when said object of reference is lit with the R, G, and B light channels, respectively and the other three of the said six matrices containing respective R, G, and B, components obtained when the object of reference is lit with the said UV light channel;

(c) generating a catalogue of restoring or constituent material, by using one or more laminar samples of a material to be catalogued, such samples having pre-established area; where each pre-established area has different pre-established thicknesses; obtaining thus a cataloguing of such restoration or constituent material from the quantification of corresponding six matrices with light data, obtained from said sample; where such quantification includes the extraction of the color values, provided by the RGB and UV lights of each one of such areas of such six matrices of said laminar samples; applying to said color values and adjustments to obtain a function of color versus thickness which is stored in a restoration or constituent materials catalogue;

(d) acquiring the R, G, B and UV color of said object of reference;

(e) determining a combination of restoration or constituent materials layers, previously catalogued in step (c) above, which will behave in a manner optically equivalent to the colors (R, G, B and UV) of said object of reference, acquired in step (d) above, in which a materials layer determination is carried out by:

e1. determining the arithmetic minimum of the arithmetic differences, weighted, between the colors of the object of reference, considering the background color in which said colors of the object of reference were obtained, and the colors of each catalogued material, selected from those the optic nature of which is typical of the first layer of the object of reference, designating as a new background color that obtained for the catalogued material which has the minimum value of said arithmetic differences;

e2. repeating the previous sub stage of minimizing the arithmetic differences, weighted, between the same colors of the object of reference, considering the new background color obtained in the previous sub stage, and the colors of each catalogued materials selected, this time, from among those the optical nature of which is typical of the next layer of the object of reference; designating as a new background color that obtained for the catalogued material having the minimum value of said arithmetic differences of this stage; and e3. applying the previous stage iteratively, with the corresponding background color substitutions and inspecting the relevant catalogued materials sub sets, corresponding to the optical nature of the layer under determination, until completing all the layers that will make up the combination of restoration or constituent materials layers;

(f) storing and displaying the values of the materials and thicknesses of the layers determined at the end of step (e) above.

2. The method of claim 1, wherein said adjustment of color values in step (c) is an adjustment through minimum squares.

3. The method of claim 1, wherein step (e), the determination of a combination of restoration or constituent materials layers is carried out through the Kubelka-Munk model, applying the criterion of the conservation of light intensity irradiating through said restoration or constituent materials layers and considering the parameters of dispersion and light absorption of said restoration or constituent materials.

4. The method of claim 1, wherein such object of reference is a tooth, where the tooth has three layers, and where opaque dentine, body dentine, and enamel, are the restoration or constituent materials.

5. The method of claim 1, wherein said lighting in step (a) is carried out with two types of sources; where a first type of source lights with RGB light wavelengths, and where a second type of source lights with a UV light wavelength; where the first type of source is capable of activating its RGB colors, simultaneously or selectively.

6. The method of claim 1, wherein the display of such values obtained in step (f) is carried out through image visualization means, showing color maps, contrast between the target color and the attained one, simulation of the repair on the image of the real tooth, alphanumeric information, or a combination of the above.

7. The method of claim 1, wherein said images of said objects of reference capable of containing information to generate six matrices with light data, consist in four images; where three out of the four said images are monochromatic and correspond to each one of the RGB channels when said object of reference is lit with a respective R, G, and B light channel, and when a fourth image, out of said four images, is in color and corresponds to the response of said object of reference before ultraviolet (UV) light, and this fourth color image made up of three channels of the respective R, G and B responses.

8. A device for lighting and capturing images of a sample comprising a digital means for the capture of images, diffusing translucent means, lighting sequence means, and an annular lighting means, where the digital means for the capture of images has an optical axis, where the annular lighting means is arranged such that its light will not fall directly on such digital means for the capture of images, where such annular lighting means has a symmetry axis that is coincident with the normal of a plane of the sample where the sample will be placed and coincident with the optical axis of said digital means for the capture of images;

where the annular lighting means comprises light sources, where the light sources comprise red (R), green (G), blue (B), and ultraviolet (UV) channels, where the light sources are lined with a reflecting surface which prevents the emitted light from falling on the plane of the sample;

where the diffusing translucent means is interposed between the plane of the sample and the annular lighting means, where the lighting sequence means commands the turning on an off of the different light sources to select individually or in combination the R,G,B, and UV channels, where the lighting sequence means also captures four types of images, where each of the four types of images corresponds to the R, G, B, and UV channels, respectively.

9. The device of claim 8, wherein the light sources comprise a first RGB lighting means and a second UV lighting means.

10. The device of claim 9, wherein the lighting means is made up of a plurality of pointed light sources.

11. The device of claim 10, wherein the plurality of pointed light sources comprise light emitting diodes (LEDs).

12. The device of claim 8, wherein the lighting sequence means, when activated by an operator or user, generates a first pulse of white light (RGB) which starts a sequence of image capture integrated by:
   a succession of three pulses which successively activate R,G, and B lighting, regardless of the order, provided that this order, whatever it may be, remains constant, and activate a corresponding monochromatic image capture; and
   a pulse which activates UV lighting and a corresponding polychromatic image capture.

13. The device of claim 12, wherein said lighting sequence means includes timing and control means which permit setting an amount of time and a light intensity with which the light sources are turned on, as well as commanding the R, G, B, and UV channel to be activated.

14. A method to quantitatively determine the surface optical characteristics of a tooth comprising the following steps:
   (a) lighting the tooth with one or more light sources, where the light sources comprise, jointly or separately, the red (R), green (G), blue (B), and ultraviolet (UV) channels;
   (b) obtaining images of the tooth, where the images are capable of containing information to generate six matrices with light data; with three of said six matrices containing respective R, G, and B components obtained when the tooth is lit with the R, G, and B light channels, respectively and the other three of the said six matrices containing respective R, G, and B, components obtained when the tooth is lit with the UV light channel;
   (c) generating a catalogue of restoring or constituent material, by using one or more laminar samples of a material to be catalogued, such samples having pre-established area; where each pre-established area has different pre-established thicknesses; obtaining thus a cataloguing of such restoration or constituent material from the quantification of corresponding six matrices with light data, obtained from said sample; where such quantification includes the extraction of the color values, provided by the RGB and UV lights of each one of such areas of such six matrices of said laminar samples; applying to said color values and adjustments to obtain a function of color versus thickness which is stored in a restoration or constituent materials catalogue;
   (d) acquiring the R, G, B and UV color of the tooth;
   (e) determining a combination of restoration or constituent materials layers, previously catalogued in step (c) above, which will behave in a manner optically equivalent to the colors (R, G, B and UV) of the tooth, acquired in step (d) above, in which a materials layer determination is carried out by:
      e1. determining the arithmetic minimum of the arithmetic differences, weighted, between the colors of the tooth, considering the background color in which said colors of the tooth were obtained, and the colors of each catalogued material, selected from those the optic nature of which is typical of the first layer of the tooth, designating as a new background color that obtained for the catalogued material which has the minimum value of said arithmetic differences;
      e2. repeating the previous sub stage of minimizing the arithmetic differences, weighted, between the same colors of the tooth, considering the new background color obtained in the previous sub stage, and the colors of each catalogued materials selected, this time, from among those the optical nature of which is typical of the next layer of the tooth; designating as a new background color that obtained for the catalogued material having the minimum value of said arithmetic differences of this stage; and
      e3. applying the previous stage iteratively, with the corresponding background color substitutions and inspecting the relevant catalogued materials sub sets, corresponding to the optical nature of the layer under determination, until completing all the layers that will make up the combination of restoration or constituent materials layers.

15. The method of claim 14, further comprising the step of storing the values of the materials and thicknesses of the layers determined at the end of step (e) above.

16. The method of claim 15, where the values of the materials and thicknesses of the layers are stored within a database.

17. The method of claim 14, further comprising the step of displaying the values of the materials and thicknesses of the layers determined at the end of step (e) above.

18. The method of claim 14, where opaque dentine, body dentine, and enamel, are the restoration or constituent materials.

19. The method of claim 14, wherein said lighting in step (a) is carried out with two types of sources; where a first type of source lights with RGB light wavelengths, and where a second type of source lights with a UV light wavelength; where the first type of source is capable of activating its RGB colors, simultaneously or selectively.

20. The method of claim 14, further comprising the steps of
   (f) lighting the restoration or constituent materials with one or more light sources, where the light sources comprise, jointly or separately, the red (R), green (G), blue (B), and ultraviolet (UV) channels;
   (g) obtaining images of the restoration or constituent materials, where the images are capable of containing information to generate six matrices with light data;
   with three of said six matrices containing respective R, G, and B components obtained when the restoration or constituent materials are lit with the R, G, and B light channels, respectively and the other three of the said six matrices containing respective R, G, and B, components obtained when the restoration or constituent materials are lit with the UV light channel;
   where steps (f) and (g) are used to generate the catalogue in step (c).

* * * * *